R. W. VAN NORDEN.
ELECTROMAGNETIC POWER TRANSMISSION APPARATUS.
APPLICATION FILED OCT. 30, 1918.
1,422,243. Patented July 11, 1922.
4 SHEETS—SHEET 1.
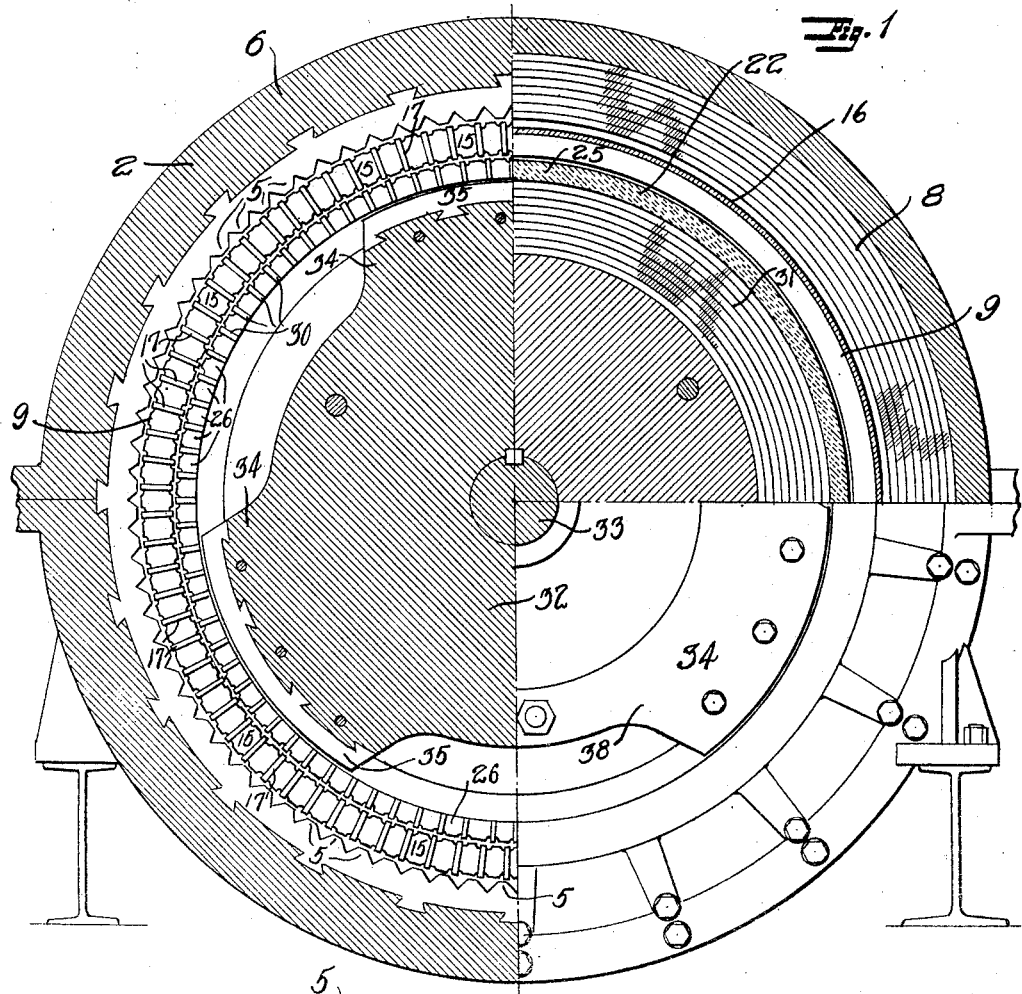
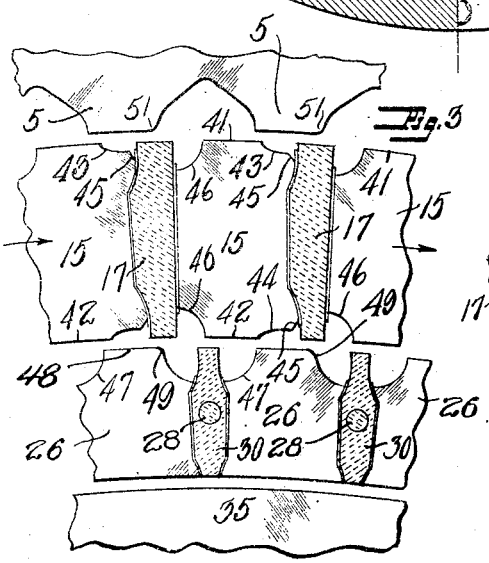
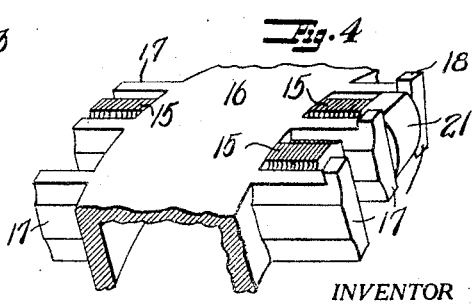
INVENTOR
R. W. VAN NORDEN
BY *White & First*
HIS ATTORNEYS

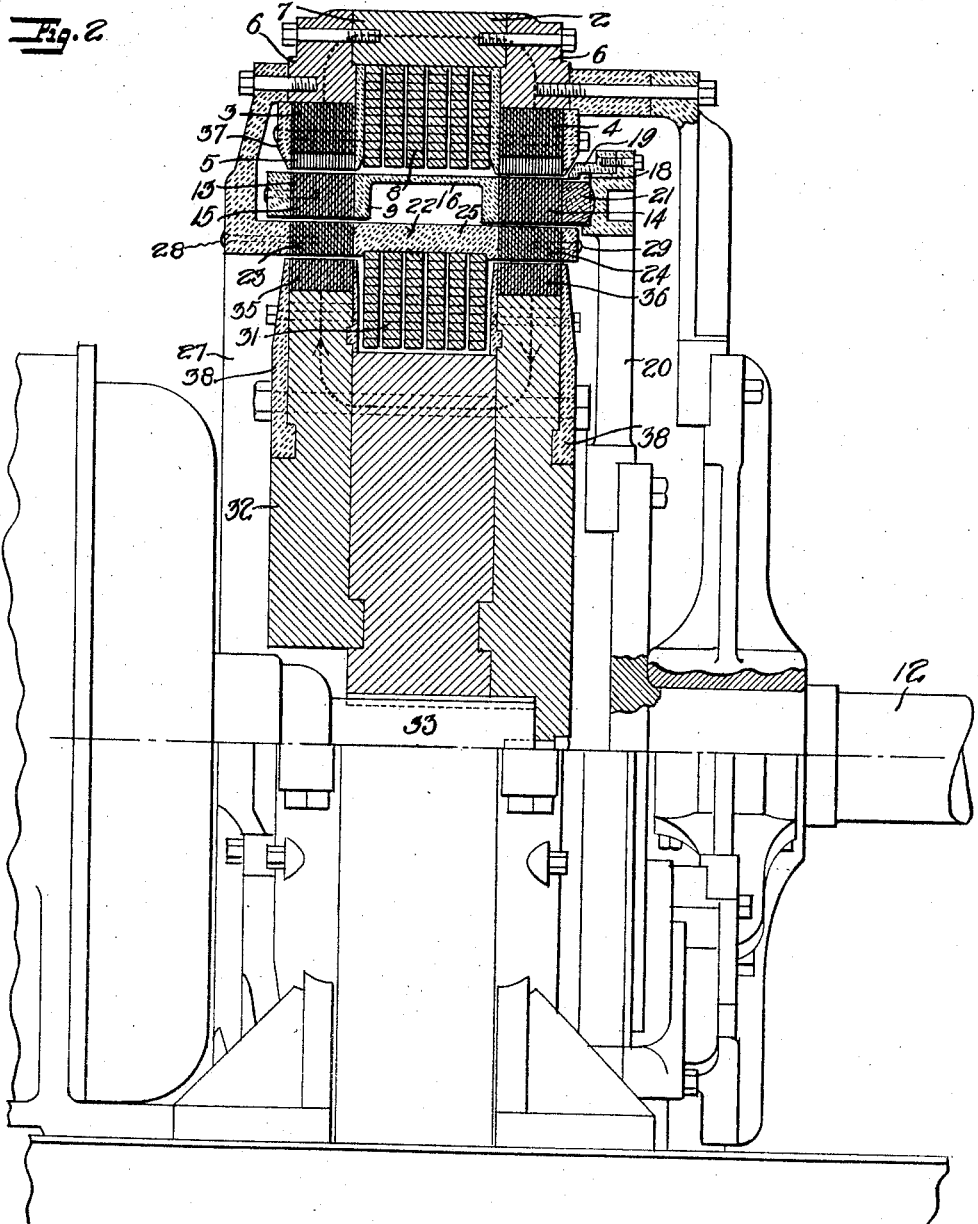

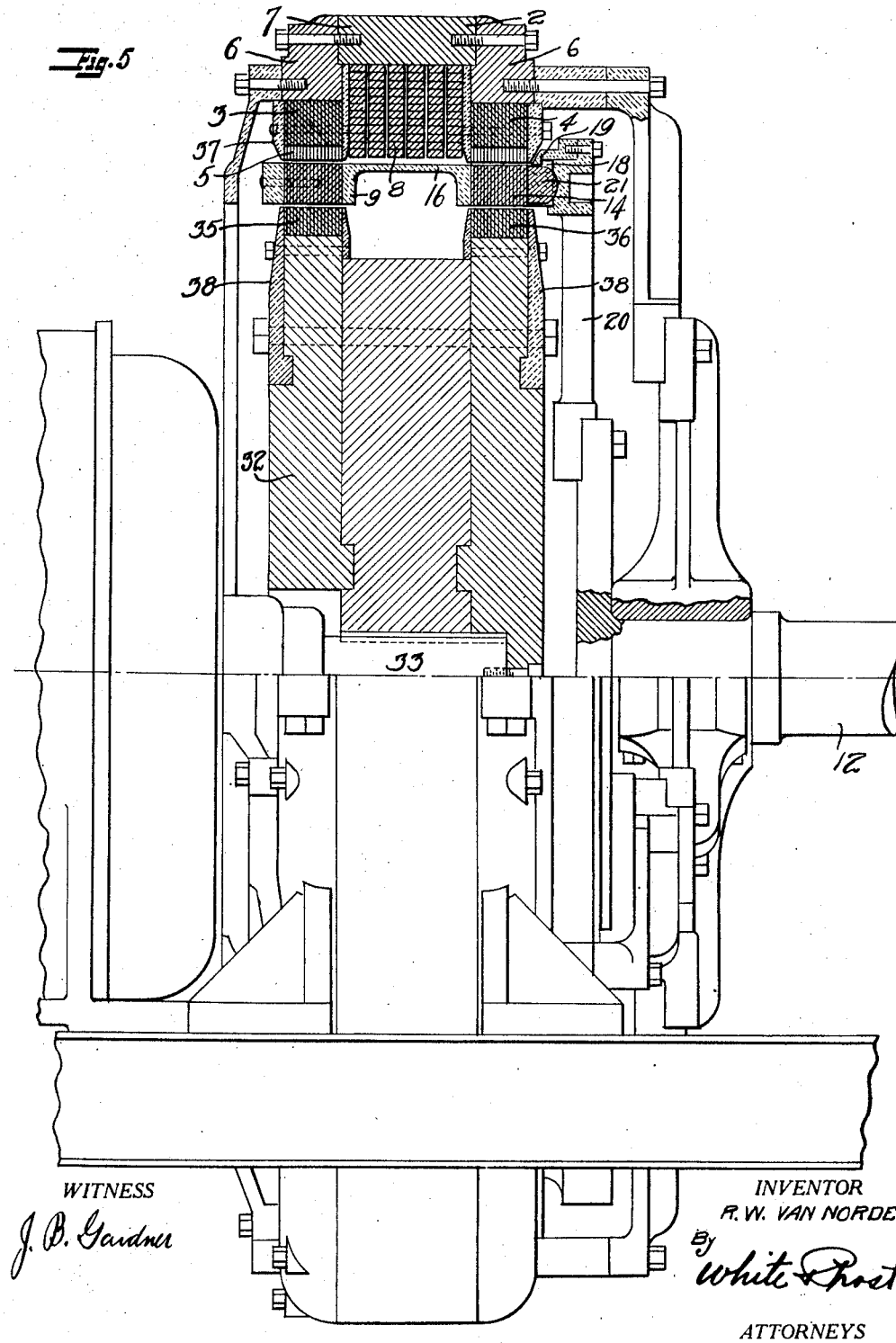

R. W. VAN NORDEN.
ELECTROMAGNETIC POWER TRANSMISSION APPARATUS.
APPLICATION FILED OCT. 30, 1918.
1,422,243. Patented July 11, 1922.
4 SHEETS—SHEET 4.
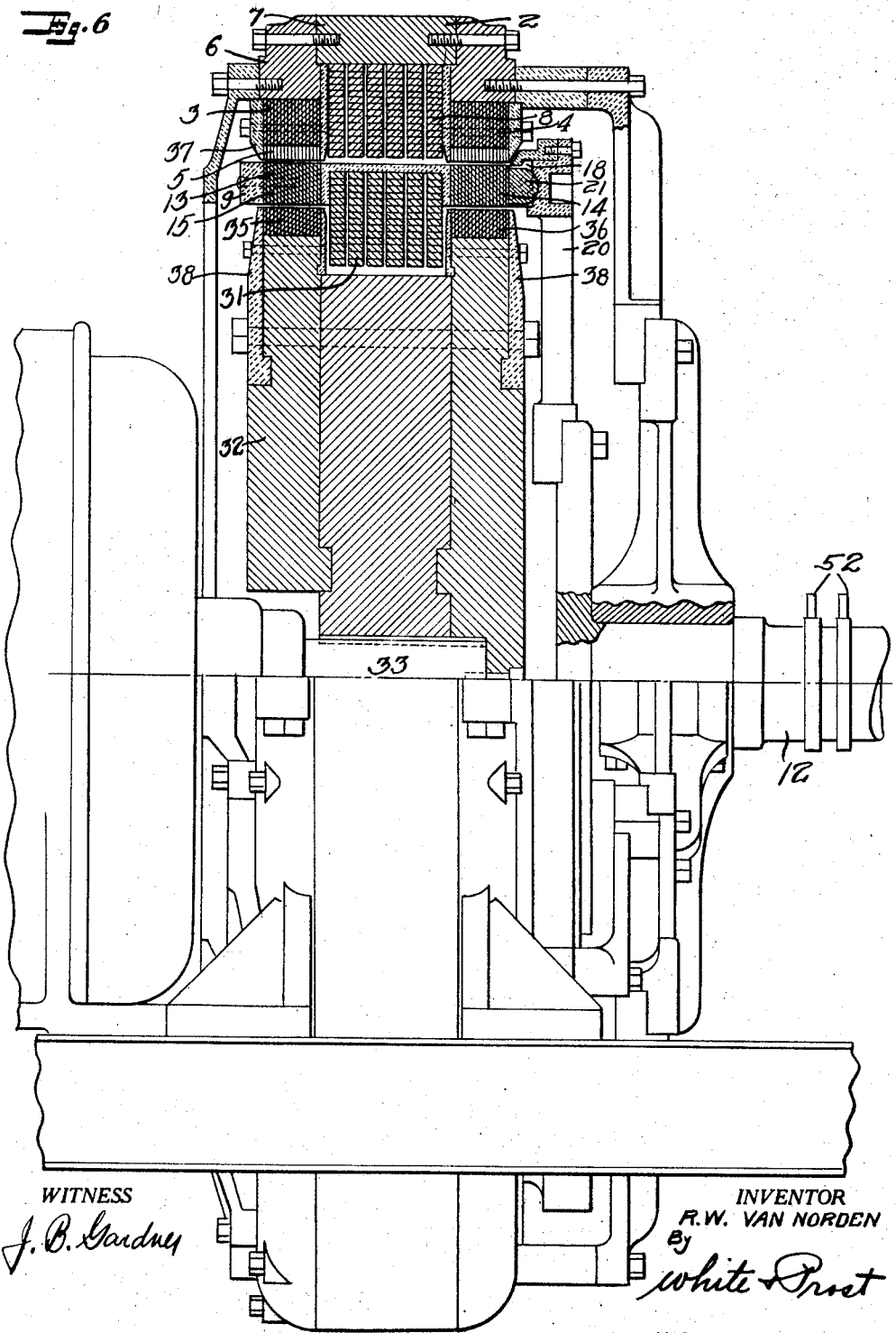
WITNESS
J. B. Gardner
INVENTOR
R. W. VAN NORDEN
By
White Prost
HIS ATTORNEYS

UNITED STATES PATENT OFFICE.

RUDOLPH W. VAN NORDEN, OF SAN FRANCISCO, CALIFORNIA.

ELECTROMAGNETIC POWER-TRANSMISSION APPARATUS.

1,422,243.    Specification of Letters Patent.    Patented July 11, 1922.

Application filed October 30, 1918. Serial No. 260,223.

*To all whom it may concern:*

Be it known that I, RUDOLPH W. VAN NORDEN, a citizen of the United States, and a resident of the city and county of San Francisco and State of California, have invented a certain new and useful Electromagnetic Power-Transmission Apparatus, of which the following is a specification.

The invention relates to an electromagnetic apparatus for reducing mechanical revolving motion from one speed to another and is ordinarily known as an electromagnetic speed reduction gear. Devices of this character have heretofore been proposed, but these prior devices have contained certain limitations and deleterious features, which it is an object of this invention to overcome.

An object of the invention is to increase the magnetic efficiency of apparatus of this nature by shortening the paths of the magnetic lines of force, thus reducing the reluctance and allowing a greater proportion of magneto motive force at its effective zones, and by reducing the leakage fluxes.

Another object of the invention is to provide a construction in which any desired amount of exciting winding may be employed, thus producing the desired magneto motive force, and in which the exciting winding is stationary.

A further object of the invention is to provide an improved form of tooth or segment whereby the efficiency of the apparatus is increased.

The invention possesses other advantageous features, some of which, with the foregoing, will be set forth at length in the following description, where I shall outline in full that form of the invention which I have selected for illustration in the drawings accompanying and forming part of the present specification. In said drawings I have shown one specific form of my invention and a modification thereof, but it is to be understood that I do not limit myself to such forms, since the invention, as expressed in the claims, may be embodied in a plurality of forms.

Referring to said drawings:

Figure 1 is a vertical cross section of the machine of my invention, the sections being taken in a plurality of planes.

Figure 2 is a side elevation of the machine of my invention, the upper half being shown in section.

Figure 3 is a detail of the stator and rotor teeth or segments.

Figure 4 is a perspective view of a fragment of the driven rotor.

Figure 5 is a vertical cross section of a modified form of machine in which the inner stator segments and inner exciting coil are omitted.

Figure 6 is a vertical cross section of another modified form of machine, similar to that shown in Figure 5 and including an inner exciting coil.

The machine of my invention includes a high speed rotor, driven by a steam turbine or other source of power, a low speed rotor secured or connected to the driven shaft and a stator, the two rotors and the stator being coupled by a magnetic flux. A machine of this type is shown in United States Letters Patent No. 1,171,134, in which the magnetic flux passes across two gaps between the inner rotor and the stator. Theoretically, the flux across two gaps, both creating torque on the low speed rotor, would double the effective torque. The added gap and segments or teeth, however, will require additional magneto motive force in order to force the same number of lines of force through this added reluctance, and since this M. M. F. amounts to almost double that required for a single pulling gap, substantially double the number of ampere turns will be required on each pole. If the number of ampere turns per pole is not so increased, the M. M. F. per gap is reduced due to the increased reluctance and leakage area so that actually the two gap construction would produce less torque than a one gap construction. The machine of my invention is constructed so that the number of ampere turns may be properly increased, the reluctance of the magnetic path reduced and all leakage taken care of outside of the working flux paths.

In accordance with my invention I provide means for producing a revolving magnetic field by rotating one of the elements of the machine, but the angular velocity of the field is different from the angular velocity of the rotated element. Cooperating with the rotated element is a driven rotatable element and a stationary element, which are provided with co-operative series of magnetic conductors which successively assume radial alinement as the field revolves, thereby producing rotation of the driven rotatable element. In the preferred construction of my machine, the stator is divided into two parts, spaced apart radially and comprising an inner stator arranged between the two rotors and an outer stator surrounding the low speed rotor. An exciting coil is preferably arranged on each stator, but in some instances the exciting coil on the inner stator may be dispensed with.

The machine comprises an outer stator 2, suitably mounted and supported, and consisting of two longitudinally spaced laminated steel or iron cores 3—4, the cores being similar and being provided with regularly projecting teeth 5. The cores 3—4 are mounted by a dovetailed mounting or other suitable means of intimate contact on the outer solid rings 6 and the rings 6 are bolted or otherwise secured to the central ring 7 which spaces the cores 3—4 apart. Within the annular channel between the cores 3—4 and the ring 7 is an exciting coil 8, annular in shape and having its axis coinciding with the axis of the machine. The exciting coil is preferably formed of strap copper, covered with mica or other heat resistant insulation so that it may be safely worked at high temperatures.

Arranged within the outer stator is the driven rotor 9 which is secured to the driven shaft 12. The rotor 9 comprises two annular cores 13—14 made up of laminated teeth or segments 15, the cores being of the same width as the cores 3—4 and being spaced apart longitudinally the same distance, so that cores 3 and 13 lie in the same transverse plane and cores 4 and 14 lie in the same transverse plane. The cores 13—14 are spaced apart longitudinally by a central ring 16, of bronze or other suitable non-magnetic material having the requisite strength, and the ring 16 is provided with longitudinally extending integral lugs 17 between which the laminated segments are arranged and whereby they are held in place. The lugs 17 on one side of the ring are provided on their ends with projections 18 which are engaged by the clamping ring 19, bolted to the bronze spider 20 for clamping the lugs to the spider. The laminations 15 are held compressed and rotational movement of the ring with respect to the spider 20 is prevented by wooden blocks 21 arranged between the lugs and seating in depressions in the spider. The lugs are insulated from the clamping ring and the spider by suitable sheet insulation arranged therebetween. The teeth or segments in each core 13—14 are spaced apart regularly circumferentially, and the number of teeth in each core 13—14 is different from the number of teeth in each core 3—4, so that the angular pitches of the teeth in the two cores 3 and 13 for example are different to produce the gradual circumferential progression of the magnetic path of least reluctance as is set forth in United States Letters Patent No. 1,171,134.

The inner stator 22 comprises two annular laminated cores 23—24 spaced apart longitudinally the same distance as the other cores by the central ring 25 of bronze or similar material. The laminated cores 23—24 consist of teeth or segments 26 spaced apart regularly circumferentially, the teeth having the same angular pitch as the teeth on the outer stator and being radially alined therewith. The inner stator is supported on the stator frame 27 by bolts 28, preferably extending into the lugs 30 projecting from the ring 25 and between which the teeth 26 are placed. The outer core 24 is secured to the ring 25 by bolts 29, similarly placed. Supported on the ring 25 and lying between the planes of the cores 23—24 is an inner exciting coil 31, annular in shape and co-axial with the outer exciting coil. The inner coil 31 is constructed in the same manner as the outer exciting coil.

Arranged within the inner stator 22 is the driving rotor 32 which is secured to the drive shaft 33. The rotor 32 is usually driven at high speed, such as is produced by direct connection with a steam turbine, and is preferably formed of steel plates securely fastened together. The central portion of the rim of the rotor 32 is of less diameter than the end plates, which are each provided with a plurality of regularly spaced projections 34 which lie in the planes of the cores 3 and 4. Secured to each projection 34 and forming intimate contact therewith, are laminated pole faces 35—36 which lie closely adjacent the teeth 26, each pole face spanning a plurality of teeth 26. The exciting coils are connected in series or in parallel, preferably in series, in such manner that they produce a common flux, the path of which is indicated in a dotted line in Figure 2. A pole face 35 on one side of the rotor is longitudinally alined with a pole face 36 on the other side of the rotor and the flux path lies in the plane of the axis of the machine. This is the shortest possible path through all of the gaps and is the path of least reluctance.

By this construction, the polarity of all of the poles remains fixed, and there is never a reversal of flux across the teeth and segments and consequently, the hysteresis losses are greatly reduced. All leakage around the ends of the teeth is provided for by tapering plates 37 arranged at the sides of the stator teeth and tapering plates 38 arranged at the sides of the pole projections, and sufficient added carrying capacity is provided in the rotor and stator bodies to carry this end leakage flux, thereby preventing the robbing of flux from the pulling gaps. In the drawings I have shown a machine having three pole projections on each side, but it is to be understood that I do not limit myself to this arrangement, since any number of pole projections desired may be employed.

The torque in this machine is produced by the tangential component of the magnetic pull, caused by passing magnetic lines of force between the stator teeth 5 and 26 through the movable rotor segments 15 when the rotor segment is axially out of radial alinement with the outer and inner stator teeth. The net torque in the desired direction of rotation is the difference between the tangential components of two opposite torques which act on every rotor segment and I have designed the teeth and segments so that the pulling torque is a maximum and the dragging torque is a minimum. The air gap fluxes passing from the stator teeth through the rotor segments may be divided into three groups; first, the pulling flux, that is the flux which supplies the active pull and the tangential component of which is the required torque; second, the radial flux, which may be considered as a leakage flux, since it is always present and magnetic carrying capacity must be provided for it, but its pull on the rotor segments is always radial; and third, the dragging flux which exerts its pull on the back of the rotor segment and hence produces a negative torque.

In the present machine, I have so shaped the teeth and segments that the pulling flux is a maximum and the dragging flux is a minimum, and this is accomplished principally by making the rotor segments asymmetrical with relation to their radial axis. The segment is provided at its outer and inner surfaces with flat portions 41 and 42 which lie substantially at the center of the segment. At the forward end of the segment, the outer surface is curved inward slightly to produce the depressed portion 43, and the inner surface is similarly shaped to produce the depressed portion 44. Adjacent the forward edge of the segment, the outer and inner faces slope away from the stator teeth quite sharply, as shown at 45. The curves of the depressed portions 43 and 44 are such as to produce the greatest flux and the greatest tangential pull at that point. These curves will vary with different tooth widths and varying densities of magnetic force, so that no empirical formula can be written to cover it. At its rear, the segments are curved inward abruptly from the flat portions 41 and 42, forming the depressed portions 46, which greatly increase the length of the air gap at that point and consequently reduce the dragging flux. The teeth 26 in the inner stator are designed to give the longest flux path for the dragging and radial fluxes, by sharply curving in their rear edges on the outer surface as at 47. The path of the pulling flux is shortened by extending the forward edge of the flat portion 48 of the tooth 26 forward by the curved projection 49. The forward face of the tooth in advance of the projection 49 is cut away sharply to lengthen the flux gap at that point and thereby weaken the dragging flux to the rotor segment ahead. The teeth 5 on the outer stator have broad bases and sloping sides and the forward face of the tooth is provided with a curved projection 51, serving to increase the pulling flux.

In the construction shown in Figure 5, the inner stator 22 is omitted and the driving and driven rotors 32 and 9 are arranged in contiguity. In this arrangement, the torque is exerted between the rotors and between the outer stator and the driven rotor. The inner faces of the segments forming the cores 14 will be smooth, as are the inner faces of the segments 26, Figure 3, instead of being indented. The inner exciting coil 31, which is supported on the inner stator in Figure 2, is omitted in Figure 5, since the inner stator is omitted. When desired, however, the inner exciting coil 31 may be arranged on the driven rotor 9 as shown in Figure 6, in which instance collector rings 52 for the exciting current are arranged on the driven shaft 12.

I claim:

1. An electromagnetic power transmission apparatus, comprising an outer stator and an inner stator, each stator comprising two laminated cores spaced apart axially, a ring of magnetic material connecting the cores of the outer stator, a ring of non-magnetic material connecting the cores of the inner stator, each of said laminated cores being provided with regularly spaced teeth, the teeth on one core on one stator being radially alined with the teeth on the corresponding core on the other stator, a rotor having two spaced laminated cores arranged between said stators, said cores being divided into regularly spaced segments having a different spacing than the teeth on the stators, a rotary inductor having laminated pole pieces spaced apart axially and lying in the planes of said stator cores, and means for producing a magnetic flux through said inductor and stator and rotor cores.

2. An electromagnetic power transmission apparatus, comprising an outer stator and an inner stator, each stator comprising two laminated cores spaced apart axially, a ring of magnetic material connecting the cores of the outer stator, a ring of non-magnetic material connecting the cores of the inner stator, each of said laminated cores being provided with regularly spaced teeth, the teeth on one core on one stator being radially alined with the teeth on the corresponding core on the other stator, a rotor having two spaced laminated cores arranged between said stators, said cores being divided into regularly spaced segments having a different spacing than the teeth on the stators, a rotary inductor having laminated pole pieces spaced apart axially and lying in the planes of said stator cores, and an exciting winding arranged on the outer stator.

3. An electromagnetic power transmission apparatus, comprising an outer stator and an inner stator, each stator comprising two laminated cores spaced apart axially, a ring of magnetic material connecting the cores of the outer stator, a ring of non-magnetic material connecting the cores of the inner stator, each of said laminated cores being provided with regularly spaced teeth, the teeth on one core on one stator being radially alined with the teeth on the corresponding core on the other stator, a rotor having two spaced laminated cores arranged between said stators, said cores being divided into regularly spaced segments having a different spacing than the teeth on the stators, a rotary inductor having laminated pole pieces spaced apart axially and lying in the planes of said stator cores, and an exciting winding concentric with the axis of the cores of the outer stator arranged between the cores of the outer stator.

4. An electromagnetic power transmission apparatus, comprising an outer stator and an inner stator, each stator comprising two laminated cores spaced apart axially, a ring of magnetic material connecting the cores of the outer stator, a ring of non-magnetic material connecting the cores of the inner stator, each of said laminated cores being provided with regularly spaced teeth, the teeth on one core on one stator being radially alined with the teeth on the corresponding core on the other stator, a rotor having two spaced laminated cores arranged between said stators, said cores being divided into regularly spaced segments having a different spacing than the teeth on the stators, a rotary inductor having laminated pole pieces spaced apart axially and lying in the planes of said stator cores, and exciting windings arranged on the inner and outer stators.

5. An electromagnetic power transmission apparatus, comprising an outer stator and an inner stator, each stator comprising two laminated cores spaced apart axially, a ring of magnetic material connecting the cores of the outer stator, a ring of non-magnetic material connecting the cores of the inner stator, each of said laminated cores being provided with regularly spaced teeth, the teeth on one core on one stator being radially alined with the teeth on the corresponding core on the other stator, a rotor having two spaced laminated cores arranged between said stators, said cores being divided into regularly spaced segments having a different spacing than the teeth on the stators, a rotary inductor having laminated pole pieces spaced apart axially and lying in the planes of said stator cores, and exciting windings concentric with the axis of the apparatus arranged on said stators.

6. An electromagnetic power transmission apparatus, comprising an outer stator and an inner stator, each stator comprising two laminated cores spaced apart axially, a ring of magnetic material connecting the cores of the outer stator, a ring of non-magnetic material connecting the cores of the inner stator, each of said laminated cores being provided with regularly spaced teeth, the teeth on one core on one stator being radially alined with the teeth on the corresponding core on the other stator, a rotor having two spaced laminated cores arranged between said stators, said cores being divided into regularly spaced segments having a different spacing than the teeth on the stators, a rotary inductor having laminated pole pieces spaced apart axially and lying in the planes of said stator cores, an exciting winding on the outer stator arranged between the cores thereof, and an exciting winding on the inner stator arranged between the pole pieces of the inductor.

7. An electromagnetic power transmission apparatus, comprising an outer stator having two laminated annular cores spaced apart axially, the inner surfaces of the cores being indented to form regularly spaced teeth, an inner stator having two laminated annular cores spaced apart axially and lying within the outer cores, the outer surfaces of the cores of the inner stator being indented to form teeth of the same regular spacing, a rotor having two laminated cores spaced apart axially and lying between the inner and outer stator cores, the rotor cores being formed of segments spaced apart circumferentially, the number of segments on each core differing from the number of teeth on each core, an inductor having two sets of laminated pole pieces spaced apart axially arranged within the inner stator cores and an exciting winding arranged to produce a magnetc flux radially outward through one set of cores and radially inward through the other set of cores in the same longitudinal plane.

8. An electromagnetic power transmission apparatus, comprising an outer stator having two laminated annular cores spaced apart axially, the inner surfaces of the cores being indented to form regularly spaced teeth, an inner stator having two laminated annular cores spaced apart axially and lying within the outer cores, the outer surfaces of the cores of the inner stator being indented to form teeth of the same regular spacing, a rotor having two laminated cores spaced apart axially and lying between the inner and outer stator cores, the rotor cores being formed of segments spaced apart circumferentially, the number of segments on each core differing from the number of teeth on each core, an inductor having two sets of laminated pole pieces spaced apart axially arranged within the inner stator cores, the pole pieces in one set being alined longitudinally with the pole pieces in the other set, and means for producing a magnetic flux threading said outer stator, cores and inductor.

9. An electromagnetic power transmission apparatus, comprising an outer stator having two axially spaced laminated toothed cores, an inner stator having two axially spaced laminated toothed cores, a rotor arranged between said stators having two axially spaced laminated toothed cores, an inductor arranged within the inner stator having two sets of axially spaced laminated pole pieces, and means for producing a magnetic flux passing axially through said outer stator and inductor and radially through said cores.

10. In an electromagnetic power transmission apparatus, a rotor comprising a plurality of regularly spaced segments and a stator comprising a plurality of regularly spaced segments, said segments being shaped to provide a short flux path between the leading portion of the rotor segment and the stator segment, and a long flux path between the rear portion of the rotor segment and the stator segment.

11. An electromagnetic power transmission apparatus, comprising an outer stator having two laminated annular cores spaced apart axially, leakage flux rings arranged against the surfaces of said cores, an inner stator having two laminated annular cores spaced apart axially, a rotor having two laminated annular cores spaced apart axially arranged between the inner and outer stator cores, an inductor having two sets of laminated pole pieces arranged within the inner stator, leakage flux plates arranged against the sides of said pole pieces, and means for producing a flux traversing said cores and pole pieces.

12. An electromagnetic power transmission apparatus, comprising a stator having two toothed laminated cores spaced apart axially, a ring of magnetic material connecting the cores, a rotor having two axially spaced laminated cores arranged within and lying in the same transverse plane as said stator cores, said rotor cores being divided into regularly spaced segments having a different spacing than the teeth on the stator cores, a rotary inductor having laminated pole pieces spaced apart axially and lying within the rotor cores and means for producing a magnetic flux through said inductor and stator and rotor cores.

13. An electromagnetic power transmission apparatus, comprising a stator having two toothed laminated cores spaced apart axially, a ring of magnetic material connecting the cores, a rotor having two axially spaced laminated cores arranged within and lying in the same transverse plane as said stator cores, said rotor cores being divided into regularly spaced segments having a different spacing than the teeth on the stator cores, a rotary inductor having laminated pole pieces spaced apart axially and lying within the rotor cores and an annular exciting winding concentric with and arranged between the stator cores.

14. An electromagnetic power transmission apparatus, comprising a stator having two toothed laminated cores spaced apart axially, a ring of magnetic material connecting the cores, a rotor having two axially spaced laminated cores arranged within and lying in the same transverse plane as said stator cores, said rotor cores being divided into regularly spaced segments having a different spacing than the teeth on the stator cores, a rotary inductor having laminated pole pieces spaced apart axially and lying within the rotor cores and an exciting winding arranged on the stator.

15. An electromagnetic power transmission apparatus, comprising a stator having two toothed laminated cores spaced apart axially, a ring of magnetic material connecting the cores, a rotor having two axially spaced laminated cores arranged within and lying in the same transverse plane as said stator cores, said rotor cores being divided into regularly spaced segments having a different spacing than the teeth on the stator cores, a rotary inductor having laminated pole pieces spaced apart axially and lying within the rotor cores, and means for producing a radial magnetic flux outward through one set of cores and inward through the other set of cores in the same longitudinal plane.

In testimony whereof, I have hereunto set my hand at San Francisco, California, this 4th day of October, 1918.

RUDOLPH W. VAN NORDEN.

In presence of—
  H. G. PROST.